US011279465B2

(12) United States Patent
Marone et al.

(10) Patent No.: US 11,279,465 B2
(45) Date of Patent: Mar. 22, 2022

(54) PROPELLER BLADE ANGLE FEEDBACK ARRANGEMENT AND METHOD

(71) Applicant: PRATT & WHITNEY CANADA CORP., Longueuil (CA)

(72) Inventors: Joseph Ernesto Marone, Montreal (CA); Olivier Basse, Saint-Bruno (CA); Martin Dobson, Brossard (CA); Martin Clermont, Montreal (CA); Marc Lavoie, Otterburn Park (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 919 days.

(21) Appl. No.: 16/036,917

(22) Filed: Jul. 16, 2018

(65) Prior Publication Data
US 2020/0017195 A1 Jan. 16, 2020

(51) Int. Cl.
*B64D 45/02* (2006.01)
*B64C 11/30* (2006.01)
(Continued)

(52) U.S. Cl.
CPC .............. *B64C 11/301* (2013.01); *B64C 1/12* (2013.01); *B64C 11/30* (2013.01); *B64D 45/02* (2013.01);
(Continued)

(58) Field of Classification Search
CPC ......... B64C 1/12; B64C 11/30; B64C 11/301; H01H 47/00; H05F 3/00; B64D 45/02;
(Continued)

(56) References Cited

U.S. PATENT DOCUMENTS

| 4,934,901 A | 6/1990 | Duchesneau |
| 5,102,302 A | 4/1992 | Schilling et al. |

(Continued)

FOREIGN PATENT DOCUMENTS

| EP | 0353076 | 1/1990 |
| EP | 2883788 | 6/2015 |

(Continued)

OTHER PUBLICATIONS

Cs-P Easa: "European Aviation Safety Agency Certification Specifications for Propellers", Oct. 23, 2003 (Oct. 23, 2003), pp. 1-28, XP55733695.

*Primary Examiner* — Danny Nguyen
(74) *Attorney, Agent, or Firm* — Norton Rose Fulbright Canada LLP (57) ABSTRACT

A blade angle feedback ring assembly for an aircraft engine propeller having adjustable angle blades is provided. The feedback ring assembly comprises a feedback ring coupled to rotate with the propeller, the engine configured such that a first electrically-conductive path is defined between the propeller and the engine via the feedback ring, and an electric current conduction element provided between the propeller and the engine to define a second electrically-conductive path between the propeller and the engine in parallel to the first path, the second electrically-conductive path configured with a lower electrical resistance to conduction between the propeller and the engine than the first electrically-conductive path.

20 Claims, 8 Drawing Sheets

(51) Int. Cl.
*B64C 1/12* (2006.01)
*H05F 3/00* (2006.01)
*H02H 9/06* (2006.01)
*H02H 3/22* (2006.01)
*H01H 47/00* (2006.01)

(52) U.S. Cl.
CPC ............... *H01H 47/00* (2013.01); *H02H 3/22* (2013.01); *H02H 9/06* (2013.01); *H05F 3/00* (2013.01)

(58) Field of Classification Search
CPC ... B64D 7/00; H02H 1/00; H02H 1/04; H02H 3/22; H02H 9/06; F01D 21/00; F01D 5/02; F01D 7/00; F01D 21/003
USPC .......................................... 361/212, 218, 220
See application file for complete search history.

(56) References Cited

U.S. PATENT DOCUMENTS

| | | |
|---|---|---|
| 5,897,293 A | 4/1999 | Arel et al. |
| 5,913,659 A | 6/1999 | Doolin et al. |
| 6,077,040 A | 6/2000 | Pruden et al. |
| 8,222,762 B2 | 7/2012 | Borgen |
| 8,687,206 B2 | 4/2014 | Hockaday |
| 8,985,953 B2 | 3/2015 | Chuc et al. |
| 9,821,901 B2 | 11/2017 | Duke et al. |
| 2014/0007591 A1 | 1/2014 | Khibnik et al. |
| 2015/0139798 A1* | 5/2015 | Duke .................... B64C 11/301 416/1 |
| 2018/0306053 A1* | 10/2018 | Chapman ................ B64C 11/06 |

FOREIGN PATENT DOCUMENTS

| | | |
|---|---|---|
| EP | 3284665 | 2/2018 |
| EP | 3284666 | 2/2018 |

\* cited by examiner

FIGURE 8

PROPELLER BLADE ANGLE FEEDBACK ARRANGEMENT AND METHOD

TECHNICAL FIELD

The present disclosure relates generally to engines, and more specifically to propeller blade angle position feedback systems.

BACKGROUND OF THE ART

On featherable propeller systems, it is desirable to accurately measure the propeller blade (or beta) angle to ensure that the blade angle is controlled according to the engine power set-point requested, such as in reverse and low pitch situations, also known as the beta operating region.

Some propeller feedback systems use a phonic wheel, sometimes referred to as a beta or feedback ring, which can be vulnerable to magnetism and arc, e.g. upon a lightning strike to the propeller. Errant magnetic fields on the feedback ring may also cause false triggering of the sensor, leading to inaccurate measurements.

Therefore, improvements are needed.

SUMMARY

In accordance with a broad aspect, there is provided a blade angle feedback ring assembly for an aircraft engine propeller having adjustable angle blades is provided. The feedback ring assembly comprises a feedback ring coupled to rotate with the propeller, the engine configured such that a first electrically-conductive path is defined between the propeller and the engine via the feedback ring, and an electric current conduction element provided between the propeller and the engine to define a second electrically-conductive path between the propeller and the engine in parallel to the first path, the second electrically-conductive path configured with a lower electrical resistance to conduction between the propeller and the engine than the first electrically-conductive path.

In accordance with another broad aspect, there is provided a propeller system for an aircraft engine, the system comprising a propeller rotatable by a propeller shaft about a longitudinal axis, the propeller having blades with adjustable blade angle, a feedback ring coupled to the propeller to rotate with the propeller and to move along the longitudinal axis with adjustment of the blade angle, a first electrically-conductive path defined between the propeller and the engine via the feedback ring, and an electric current conduction element provided between the propeller and the engine to define a second and parallel electrically-conductive path between the propeller and the engine, the second electrically-conductive path configured with a lower electrical resistance to conduction between the propeller and the engine than the first electrically-conductive path.

In accordance with yet another broad aspect, there is provided a method for dissipating electrical charge in a propeller aircraft engine, the method comprising establishing, via an electric current conduction element provided between a propeller and the engine, the element selected to provide an electrically-conductive path between the propeller and the engine with a lower electrical resistance than the electrical resistance of a path defined between the propeller and a feedback ring coupled to the propeller.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
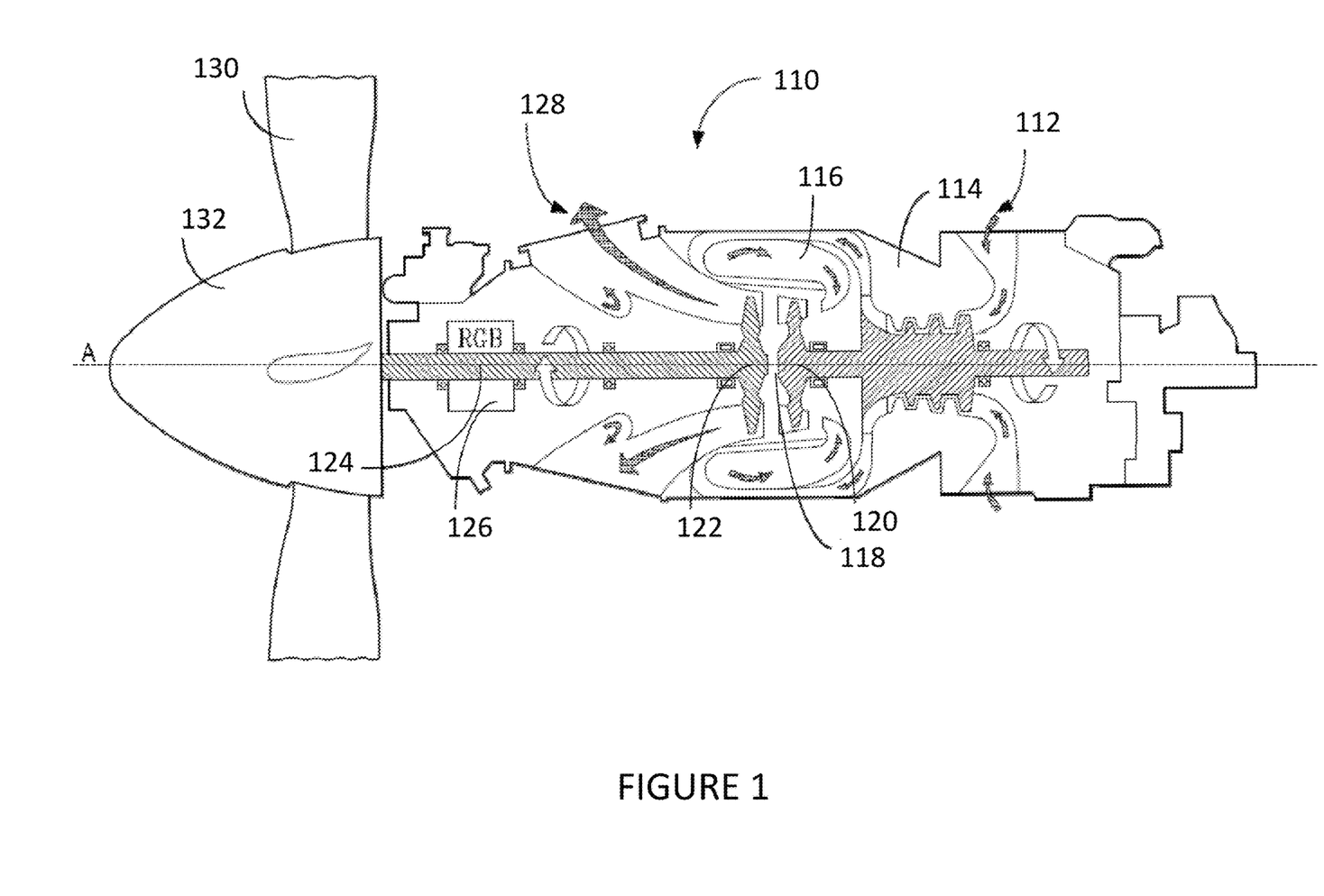
FIG. 1 is a schematic cross-sectional view of an example gas turbine engine.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades connected to a hub by any suitable means and extending radially therefrom. The blades are also each rotatable about their own radial axes through a plurality of blade angles, which can be changed to achieve modes of operation, such as feather, full reverse, and forward thrust.

Rotation of the output shaft 124 is facilitated by one or more bearing assemblies (not illustrated), which can be disposed within the RGB 126 or at any other suitable location. The bearing assemblies are electrically isolating during operation due to an oil film which is present at the bearing assemblies where they rotate. As the output shaft 124 rotates, electrical charge generates on the output shaft 124. For example, the output shaft 124 can be struck by lightning or other electrical discharges, or can be subjected to triboelectric charge accumulation. Because of the electrically isolating nature of the bearing assemblies, the output shaft 124 can accumulate an electric potential difference vis-à-vis a casing (not shown) of the engine 110. If the electric potential reaches or surpasses the breakdown threshold of the oil film in the bearing assemblies, the accumulated charge can dissipate via dielectric breakdown in the bearing assemblies. This can cause electrical discharge damage (EDD) to the bearing assemblies.

Figure 2:
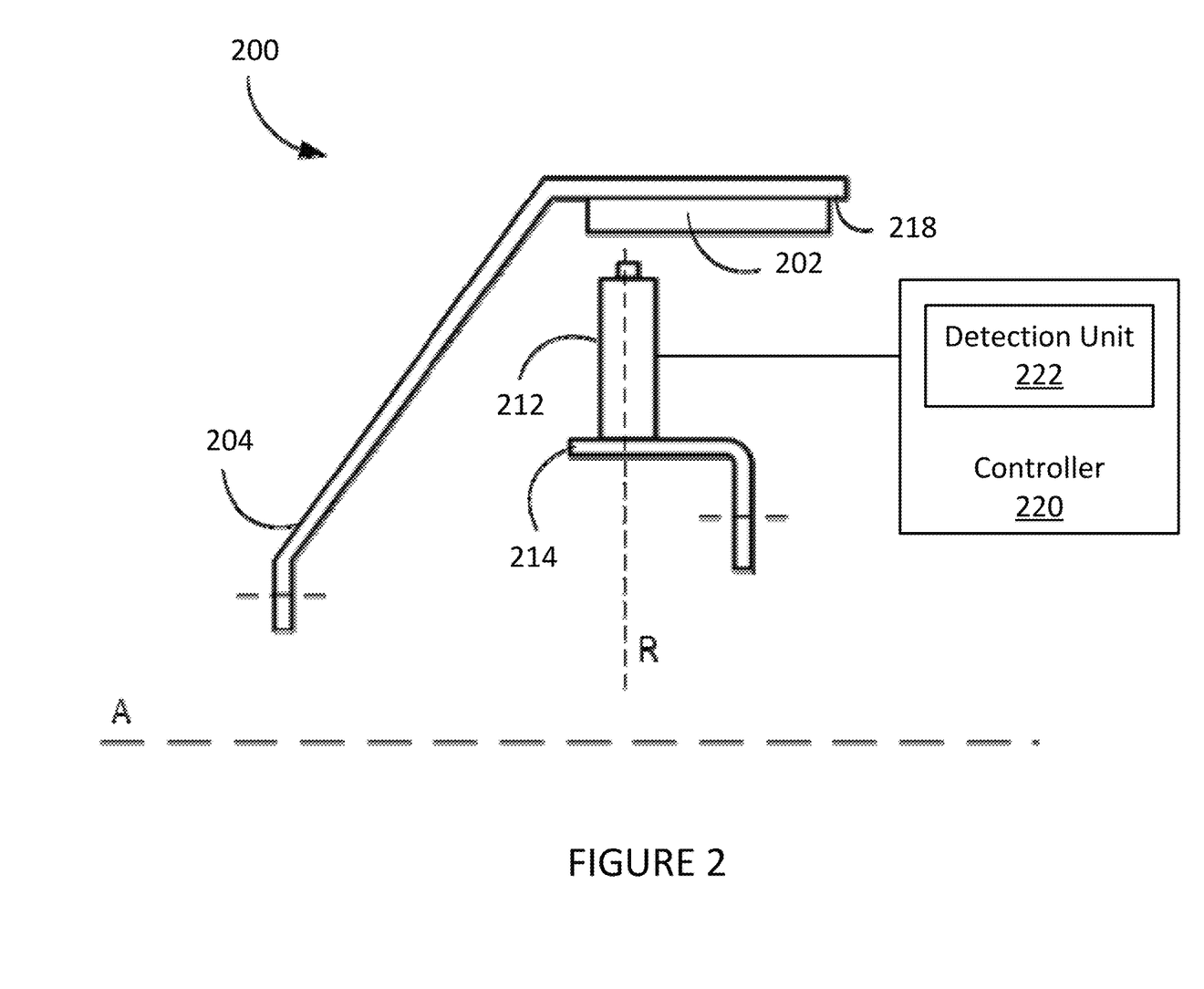
FIG. 2 is a schematic diagram of an example propeller feedback sensing system.

With reference to FIG. 2, a system 200 for sensing a feedback ring (also referred to as a phonic wheel) 204 of an aircraft propeller will now be described. In some embodiments, the system 200 provides for detection and measurement of rotational velocity of one or more rotating elements of the engine 110 and of propeller blade angle on propeller systems, such as the propeller 130 of FIG. 1. The system 200 may interface to existing mechanical interfaces of typical propeller systems to provide a digital detection for electronic determination of the propeller blade angle. It should be noted that although the present disclosure focuses on the use of the system 200 and the feedback ring 204 in gas-turbine engines, similar techniques can be applied to other types of engines, including electric engines.

The system 200 comprises an annular member 204 and one or more sensors 212 positioned proximate the annular member 204. Annular member 204 (referred to herein as a feedback ring) has a plurality of position markers (also referred to as teeth) 202 disposed thereon for detection by sensor 212. In some embodiments, the feedback ring 204 is mounted for rotation with propeller 130 and to move axially with adjustment of the blade angle of the blades of the propeller 130, and the sensor 212 is fixedly mounted to a static portion of the engine 110. In other embodiments, the sensor 212 is mounted for rotation with propeller 130 and to move axially with adjustment of the blade angle of the blades of the propeller 130, and the feedback ring 204 is fixedly mounted to a static portion of the engine 110.

The system 200 also includes a controller 220 communicatively coupled to the sensor 212. The sensor 212 is configured for producing a sensor signal which is transmitted to or otherwise received by the controller 220, for example via a detection unit 222 thereof. The sensor signal can be an electrical signal, digital or analog, an optical signal, or any other suitable type of signal. In some embodiments, the sensor 212 produces a series of signal pulses in response to detecting the presence of a position marker 202 in a sensing zone of the sensor 212. For example, the sensor 212 operates on detecting changes in magnetic flux, and has a sensing zone which encompasses a circular or rectangular area or volume in front of the sensor 212. When a position marker 202 is present in the zone, or passes through the zone during rotation of the feedback ring 204, the magnetic flux in the sensing zone is varied by the presence of the position marker 202, and the sensor 212 can produce a signal pulse, which forms part of the sensor signal.

It should be understood that, although the preceding paragraphs focus on the use of the sensor 212 which detects changes in magnetic flux due to the presence of one of the position markers 202 in the sensing zone of the sensor, other types of sensors are also considered.

In the example illustrated in FIG. 2, a side view of a portion of feedback ring 204 and sensor 212 is shown. The sensor 212 is mounted to a flange 214 of a housing of the reduction gearbox 126, so as to be positioned adjacent the plurality of position markers 202. In some embodiments, the sensor 212 is secured to the propeller 130 so as to extend away from the flange 214 and towards the position markers 202 along a radial direction, identified in FIG. 2 as direction 'R'. Sensor 212 and flange 214 may be fixedly mounted, for example to the housing of the reduction gearbox 126, or to any other static element of the engine 110, as appropriate.

In some embodiments, a single sensor 212 is mounted in close proximity to the feedback ring 204 and the position markers 202. In some other embodiments, in order to provide redundancy, one or more additional sensors, which may be similar to the sensor 212, are provided. For example, an additional sensor 212 may be mounted in a diametrically opposite relationship, or at any angle, relative to the position markers 202, which extend away from the feedback ring 204 and towards the sensor(s) 212. In yet another embodiment, several position markers 202 may be spaced equiangularly about the perimeter of the feedback ring 204. Other embodiments may apply.

Figure 3:
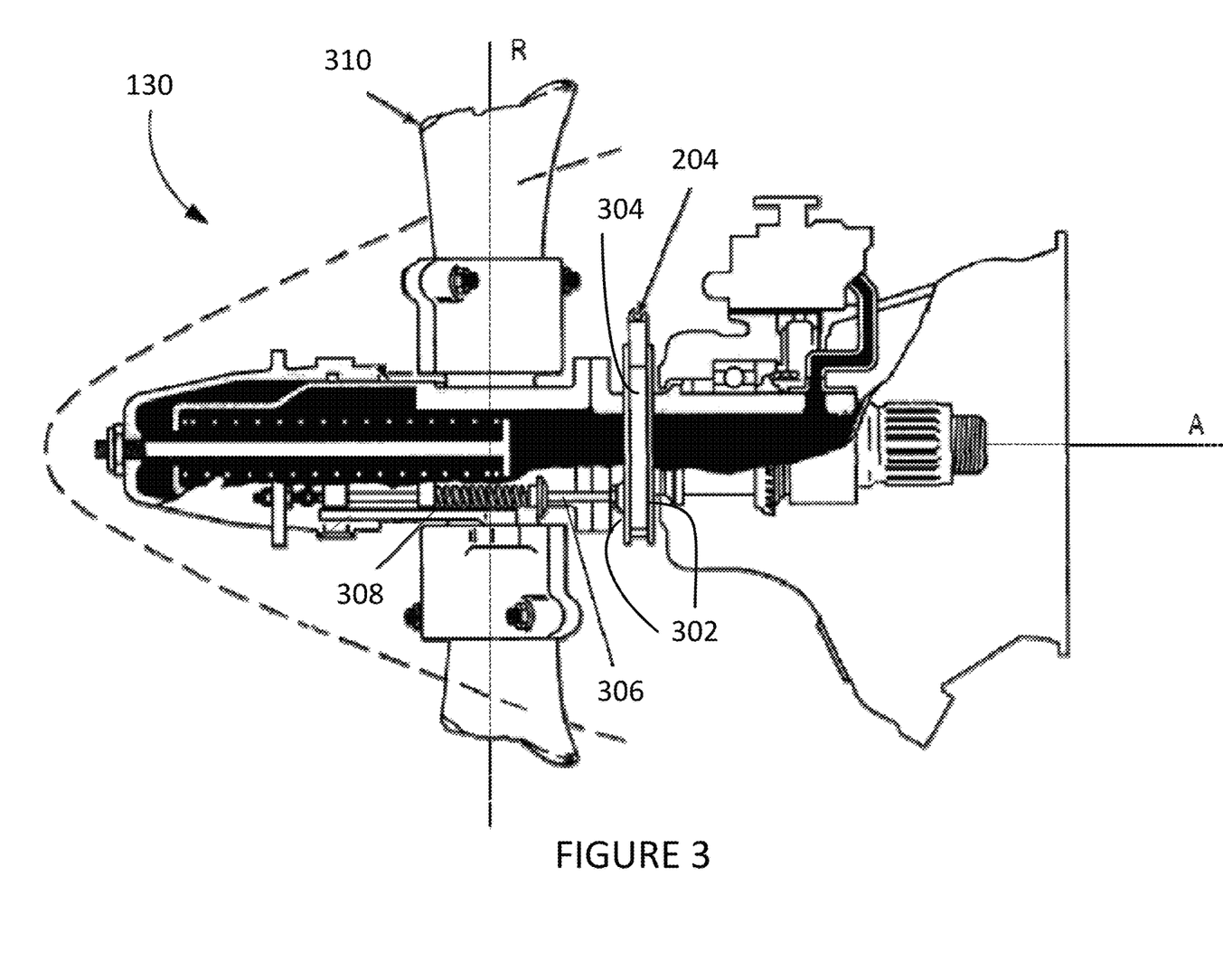
FIG. 3 is a schematic diagram of the propeller of FIG. 1 with the feedback ring of FIG. 2, in accordance with an embodiment.

With additional reference to FIG. 3, in some embodiments the feedback ring 204 is embodied as a circular disk which rotates as part of the engine 110, for example with the propeller shaft 124 or with the propeller 130. The feedback ring 204 comprises opposing faces 302 and defines a root surface 304 which extends between the opposing faces 302 and circumscribes them. Put differently, the root surface 304 of the feedback ring 204 is the outer periphery of the circular disk which spans between the two opposing faces 302. In these embodiments, the position markers 202 can take the form of projections which extend from the root surface 304.

The position markers 202 may comprise a plurality of first projections (not shown) arranged along a direction substantially transverse to the opposing faces and substantially equally spaced from one another on the root surface 304. The position markers 202 may also comprise one or more second projections (not shown) each positioned between two adjacent first projections. Each second projection is illustratively oriented along a direction, which is at an angle relative to direction along which the first projections are arranged. The angle can be any suitable value between 1° and 89°, for example 30°, 45°, 60°, or any other value, as appropriate. It should be noted, however, that in some other embodiments the second projection(s) can be co-oriented with the first projections. It should also be noted that in some embodiments, each second projection can be substituted for a groove or inward projection, as appropriate. In addition, in some embodiments, the feedback ring 204 includes only a single second projection while, in other embodiments, the feedback ring 204 can include more than one second projections. In the latter case, the second projections can be oriented along a common orientation or along one or more different orientations and each second projection can be located at substantially a midpoint between two adjacent first projections or can be located close to a particular one of two adjacent first projections.

It should be noted, however, that other embodiments are also considered. In some embodiments, the position markers can be applied to the root surface 304, for instance as strips of metal or other material for detection by the sensor 212, which can be a magnetic flux sensor. In some other embodiments, the position markers can be coloured or contrasting bands of material applied to the root surface 304 for detection by the sensor 212, which can be an optical sensor. Still other embodiments are considered.

The signal pulses produced by the sensor 212, which form part of the electrical signal received by the control system 220, can be used to determine various operating parameters of the engine 110 and the propeller 130. The regular spacing of the first projections can, for example, be used to determine a speed of rotation of the feedback ring 204. In addition, the second projection(s) can be detected by the sensor 212 to determine a blade angle of the propeller 130.

With continued reference to FIG. 3, the feedback ring 204 is supported for rotation with the propeller 130, which rotates about the longitudinal axis 'A'. The feedback ring 204 is also supported for longitudinal sliding movement along the axis A, e.g. by support members, such as a series of circumferentially spaced feedback rods 306 that extend along the longitudinal axis 'A'. A compression spring 308 surrounds an end portion of each rod 306.

As depicted in FIG. 3, the propeller 130 comprises a plurality of angularly arranged blades 310, each of which is rotatable about a radially-extending axis 'R' through a plurality of adjustable blade angles, the blade angle being the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full reverse mode is associated with negative blade angles.

Figure 4:
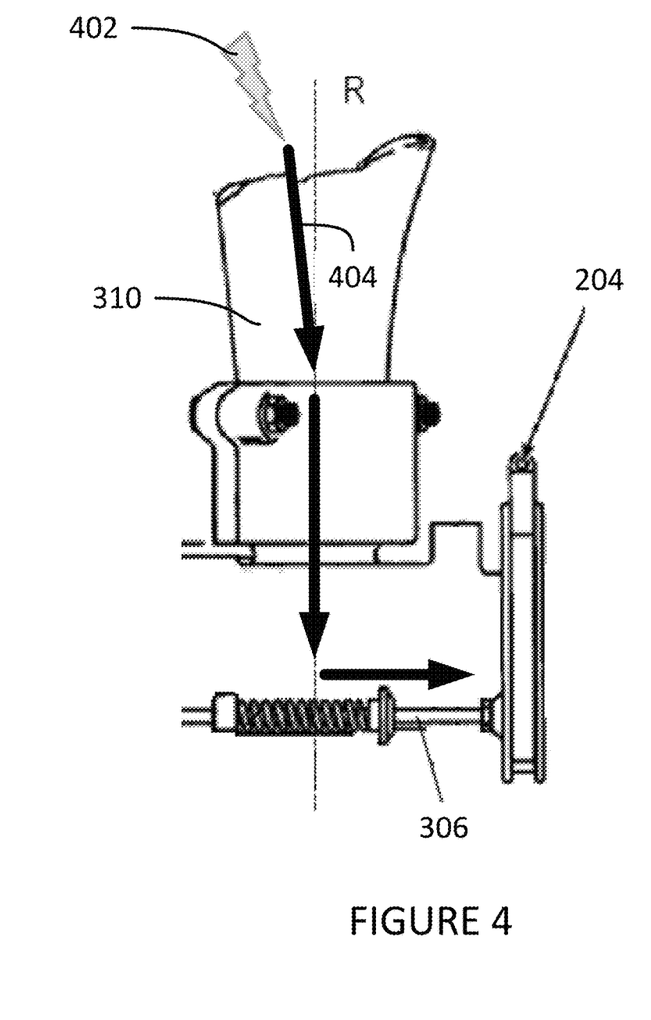
FIG. 4 is a schematic diagram of the electrical conductive path from the propeller of FIG. 1 with the feedback ring of FIG. 2, in accordance with an embodiment.

Referring now to FIG. 4 in addition to FIG. 3, upon a lightning strike 402 to the propeller 130, a current is generated that may propagate from the propeller 130 (e.g. from the blades 310) to the feedback ring 204. In particular, in existing system where the rods 306 are metallic (e.g. made of stainless steel alloy or any other suitable material), the current may propagate to the feedback ring 204 via the rods 306, along an electrical conductive path illustrated by arrows 404. As a result, the feedback ring 204 may carry a charge that can damage the propeller feedback sensing system or cause a risk to its operation. In addition, lightning may magnetize the feedback ring 204 and generate false triggering of the sensor (reference 212 in FIG. 2). Moreover, because the position markers (reference 202 in FIG. 2) potentially have a low clearance with the sensor 212, lightning current can arc across the air gap between the feedback ring 204 and the sensor 212. This may in turn result in unwanted magnetization of the feedback ring 204 and unacceptably high current levels on the engine harness attached to the sensor 212.

In order to prevent unwanted propeller feedback ring magnetism and arc (e.g. resulting from a lightning strike), it is proposed herein to define at least one additional electrical conductive path between the propeller 130 and the engine 110 by providing an electric current conduction element between the propeller 130 and the RGB 126. The at least one additional electrical conductive path is a low-resistance path that serves as an alternate or preferred path that can be followed by lightning current. The at least one additional electrical conductive path is illustratively in parallel to the existing electrical conductive path between the propeller 130 and the engine 110 (e.g. a path trough the bearing assemblies). Charge that is generated by a lightning strike and accumulated on the output shaft 124 can indeed dissipate through the at least one additional conductive path instead of through the bearing assemblies, as will be discussed further below. In addition, accumulation of any significant level of electric charge is prevented and the risk of electrical discharge damage (EDD) to the bearing assemblies in the RGB 126 is reduced. As will be also discussed further below, directing lightning current through the at least one additional conductive path reduces or eliminates the potential for electrical arcing across the air gap between the feedback ring 204 and the sensor 212.

Figure 5:
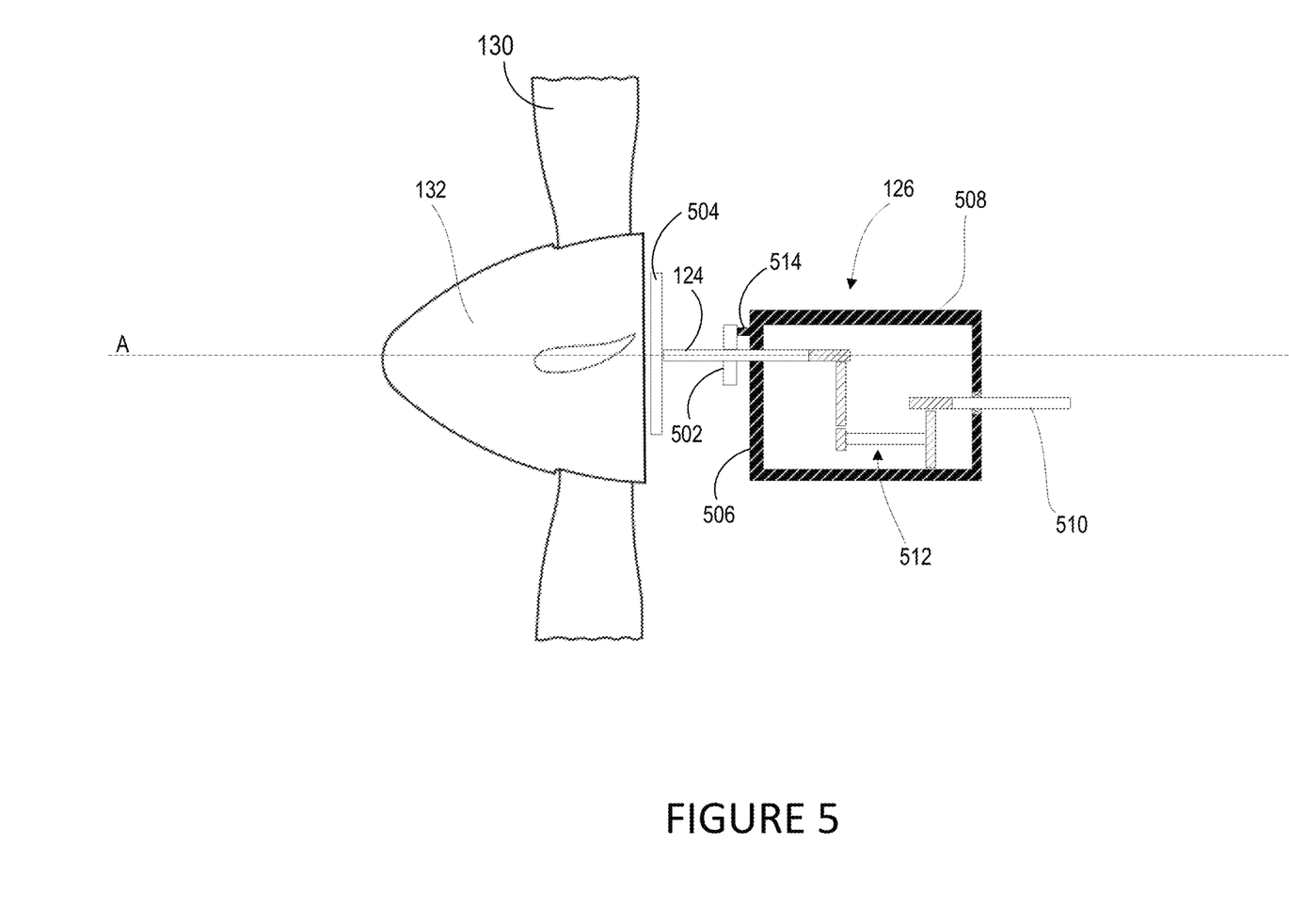
FIG. 5 is a schematic diagram of a slip ring incorporated on the propeller shaft for introducing an alternate conductive path between the propeller and the engine of FIG. 1.

Referring to FIG. 5, in one embodiment, the alternate conductive path is defined by incorporating an annular slip ring 502 on the propeller shaft 124. As will be understood by those skilled in the art, a slip ring as in 502 allows the transmission of power and electrical signals from a stationary to a rotating structure. The slip ring 502 may take the form of a spring-loaded carbon ring or block that is in contact with the propeller shaft 124. In the illustrated embodiment, the propeller 130 is mounted (e.g. with a mounting flange 504) to the propeller shaft 124, which is in turn received through an opening (not shown) in a front wall 506 of a housing 508 of the RGB 126. The RGB 126 defines a transmission path between an input (or power) shaft 510 and the propeller 130. In particular, the RGB 126 receives power from the input shaft 510 which rotates and drives the output (or propeller) shaft 124 by way of a gear train 512. The slip ring 502 is illustratively provided adjacent the opening in the front wall 506 of the housing 508 and is incorporated on the propeller shaft 124 such that the RGB 126 (e.g. the housing 508) makes contact with the propeller shaft 124 via the slip ring 502. In particular, the slip ring 502 illustratively has opposite planar faces (not shown) and is illustratively positioned such that each face lies in a radial plane, the plane substantially perpendicular to the axis A and substantially parallel to a face (not shown) of the propeller mounting flange 504.

In one embodiment, the slip ring 502 is secured to the RGB 126 through an attachment means 514. The attachment means 514 may comprise an elongate attachment member that protrudes away from the RGB 126 (e.g. from the housing 508) along a direction substantially parallel to the axis A and makes contact with a face of the slip ring 502. The slip ring 502 is illustratively configured to have a conductivity that is greater than that of the bearing assemblies that facilitate rotation of the propeller shaft 124. As a result, an electrically-conductive path is created between the propeller shaft 124 and the RGB 126 (via the slip ring 502) that has a lower electrical resistance to conduction between the propeller 130 and the engine 110 than the path to the bearing assemblies, thereby bypassing the bearing assemblies.

Figure 6:
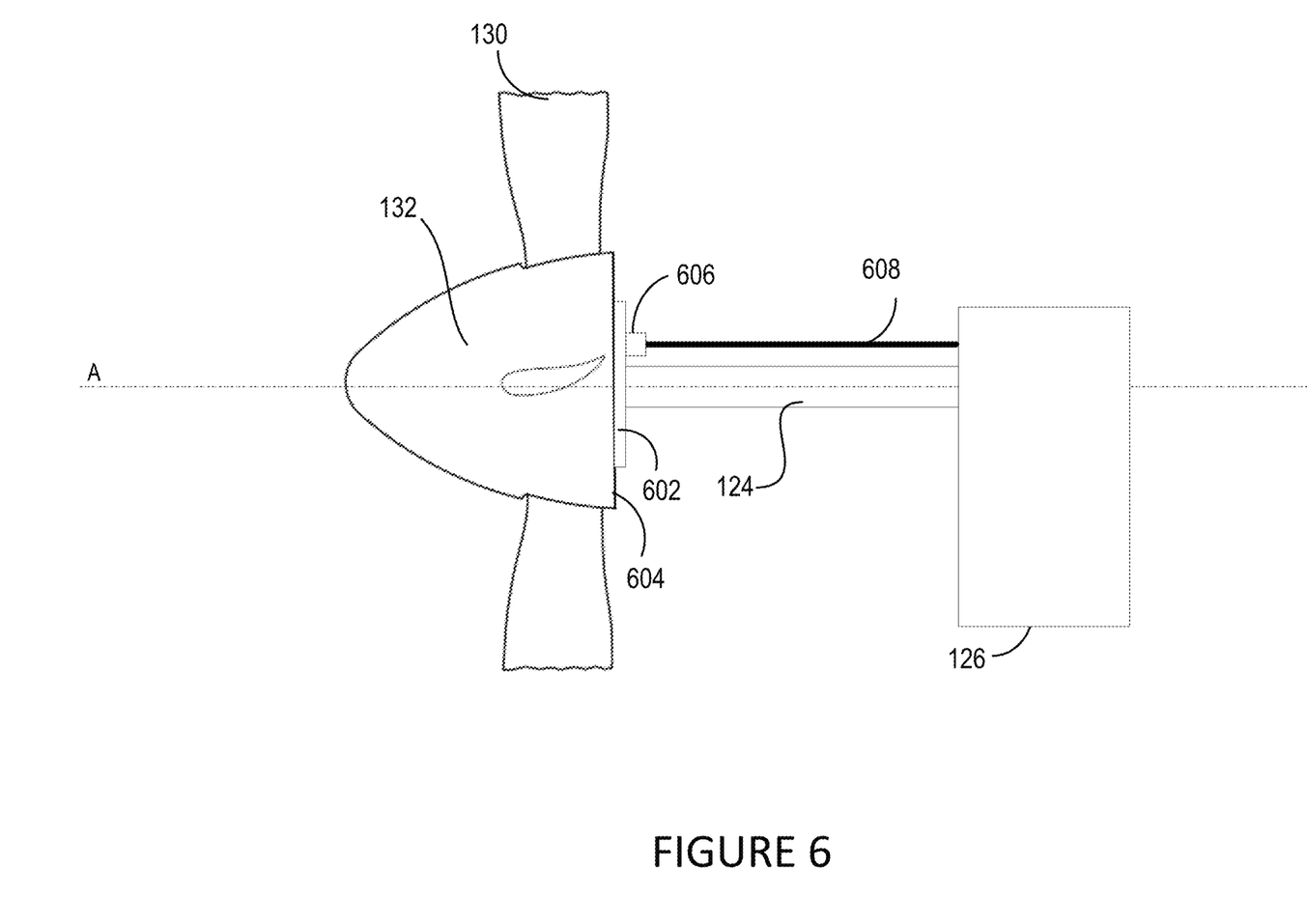
FIG. 6 is a schematic diagram of a slip ring provided on the back of the propeller for introducing an alternate conductive path between the propeller and the engine of FIG. 1.

Referring now to FIG. 6, in another embodiment, the alternate conductive path is defined by providing an annular slip ring 602 on a rear face 604 of the propeller 130 (i.e. of the propeller hub 132). In one embodiment, the slip ring 602 is electrically connected to the propeller 130 through a stationary member (not shown). In another embodiment, the slip ring 602 is electrically connected to the propeller 130 through a de-ice brush block 606. The de-ice brush block 606 is mounted on the engine 110 behind the propeller 130 and transfers electricity to the slip ring 602. In particular, the de-ice brush block 606 comprises a plurality of electrically-conductive brushes (not shown), typically of graphite composition, which each have a first end and a second end opposite to the first end. Each brush is mounted in individual brush pockets that spatially position the brushes in a manner that provides mechanical contact, and therefore electrical contact, between a first end of each brush and a surface (not shown) of the slip ring 602. The opposite end of each brush is electrically connected (e.g. via insulated wires, or the like)

to a power source. The slip ring 602 also connects to a grounding cable 608, which is in turn grounded to the RGB 126. In this manner, an electrically-conductive path is defined between the propeller 130 and the RGB 126, across the slip ring 602. This path has a lower resistance than the path to the bearing assemblies and therefore bypasses the bearing assemblies.

Figure 7:
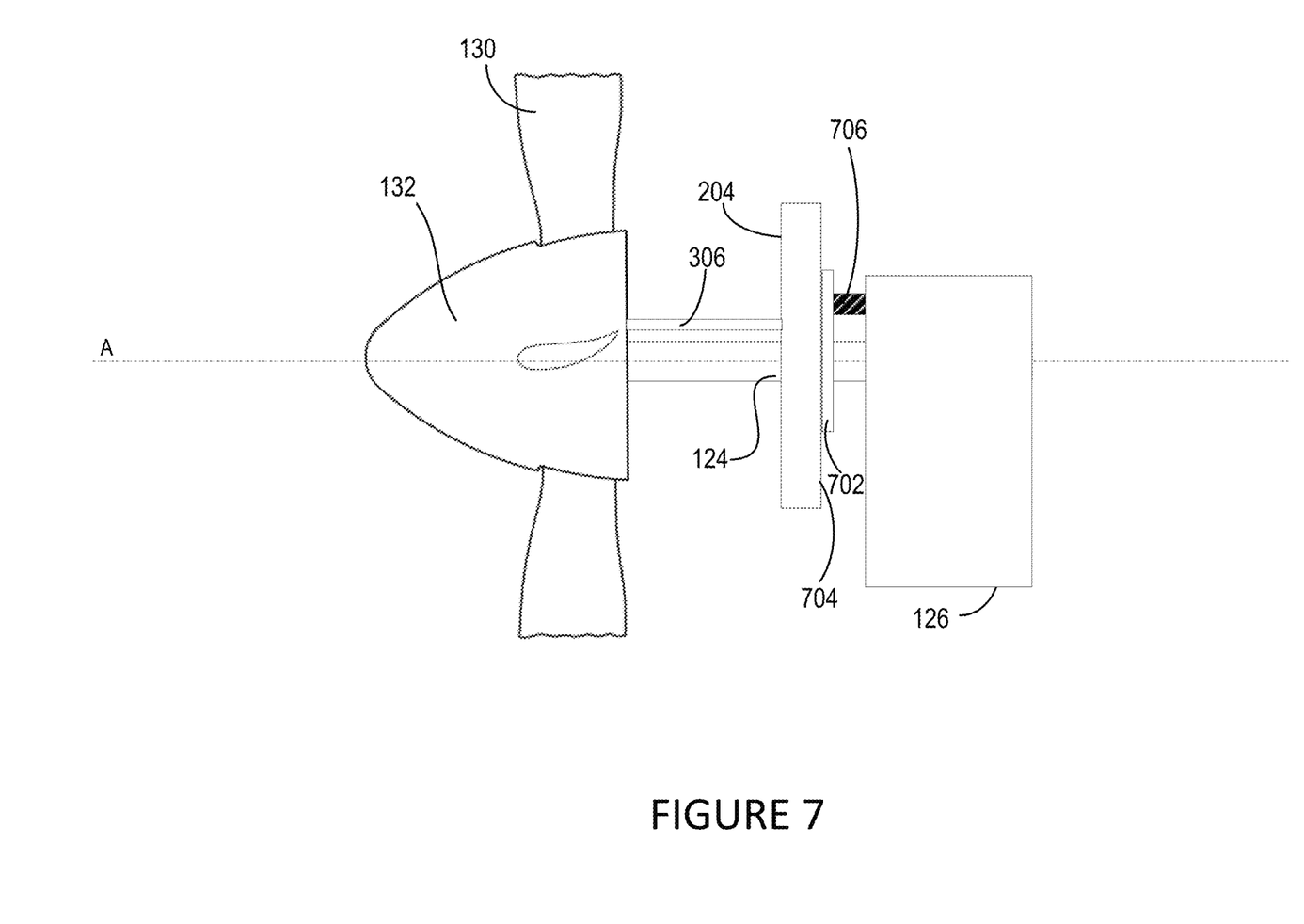
FIG. 7 is a schematic diagram of a spring loaded slip ring provided on the feedback ring for introducing an alternate conductive path between the propeller and the engine of FIG. 1.

Referring now to FIG. 7, in another embodiment, the alternate conductive path is defined by providing an annular spring loaded slip ring 702 on a rear face 704 of the feedback ring 204, the slip ring 702 configured to move axially along the axis A with the feedback ring 204. The slip ring 702 is connected to a flexible brush block 706, which grounds or electrically connects the feedback ring 204 to the RGB 126 by bypassing the propeller shaft 124.

The flexible brush block 706 is also attached (via suitable attachment means, not shown) to the RGB 126 and is spring loaded to force contact with the slip ring surface. In particular, each of the brushes of the flexible brush block 706 may be coupled to a coil spring (not shown) to force the brush block 706 into contact with the slip ring 702. In this manner, the flexible brush block 706 can follow the axial movements of the feedback ring 204 along the axis A while maintaining contact with the RGB 126. Thus, the feedback ring 204 also remains connected the RGB 126 with sliding movement of the feedback ring 204 along the axis A. A low resistance electrically-conductive path is then defined to the RGB 126 (via the slip ring 702) and serves as an alternate path through which a charge, which is generated by a lightning strike and accumulated on the output shaft 124, can dissipate.

Figure 8:
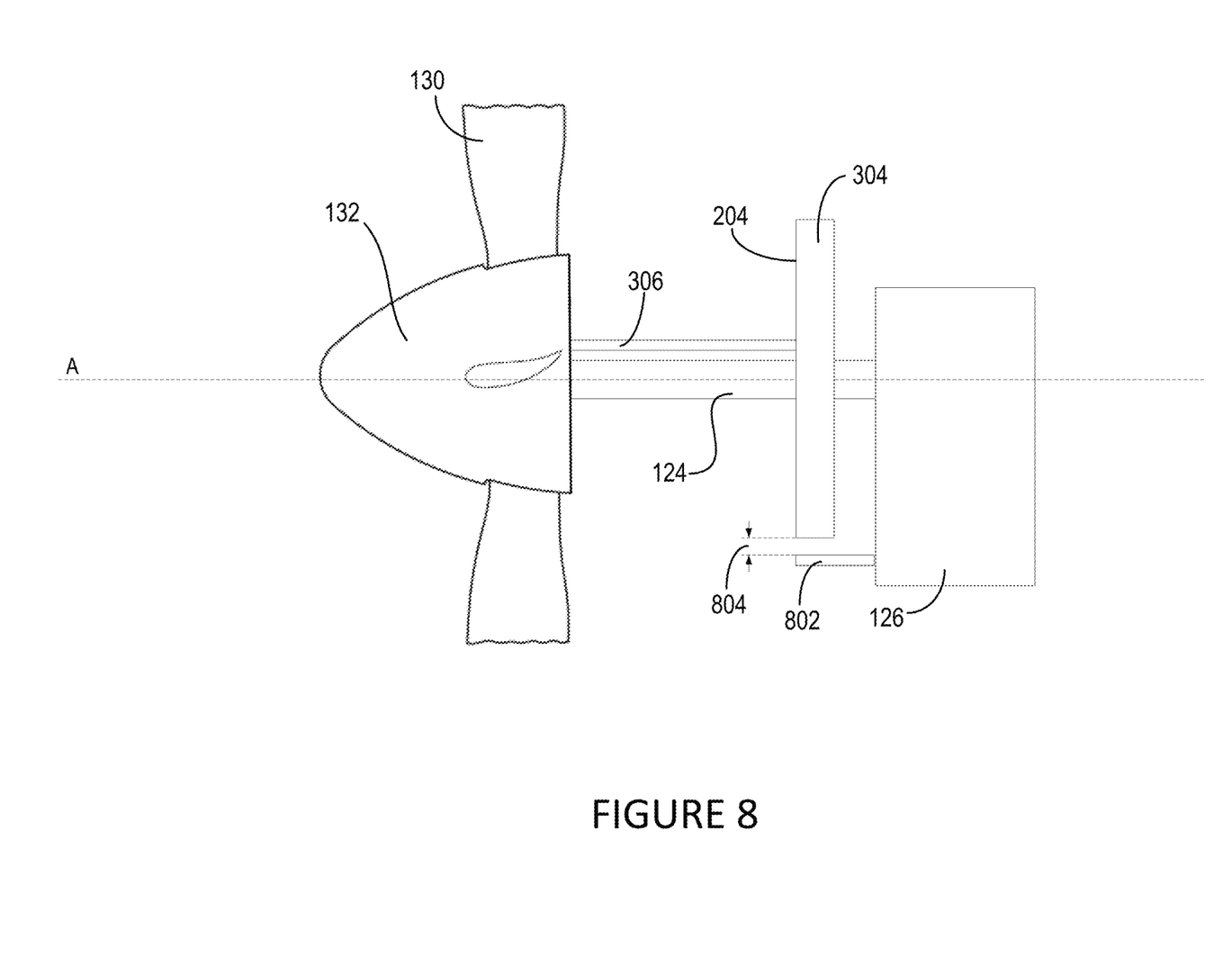
FIG. 8 is a schematic diagram of an arm protruding from the reduction gearbox of FIG. 1 to define an alternate conductive path between the propeller and the engine of FIG. 1 that avoids a path arcing through the sensor of FIG. 2.

Referring now to FIG. 8, in another embodiment, the alternate conductive path is defined by providing an engagement member (also referred to herein as an arm) 802 that protrudes away from the RGB 126 towards the exposed root surface 304 of the feedback ring 204. The engagement member 802 is illustratively made of a conductive material such as an iron, aluminum, or copper alloy. The engagement member 802 is configured such that the clearance or air gap (illustrated in FIG. 8 by the distance 804) between the engagement member 802 and the feedback ring 204 is lower than the air gap between the feedback ring 204 (e.g. the root surface 304) and the sensor (reference 212 in FIG. 2). Lightning current then arcs across the clearance, which has a lower dielectric resistance than the air gap between the feedback ring 204 and the sensor 212. In other words, lightning current arcs across the clearance between the feedback ring 204 and the engagement member 802. The potential for electrical arcing across the air gap between the feedback ring 204 and the sensor 212 can therefore be reduced or eliminated.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the feedback ring and related systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A blade angle feedback assembly for a propeller of an aircraft engine, the propeller having propeller blades rotatable about respective spanwise axes to adjust a blade angle thereof, the blade angle feedback assembly comprising:
    a feedback ring having one or more position markers disposed thereon, a first electrically-conductive path defined between the propeller and the aircraft engine via the feedback ring;
    at least one sensor configured to provide feedback on the blade angle of the propeller blades by detecting a relative movement between the feedback ring and the at least one sensor; and
    an electric current conduction element provided between the propeller and the aircraft engine to define a second electrically-conductive path between the propeller and the aircraft engine in parallel to the first electrically-conductive path, the second electrically-conductive path configured with a lower electrical resistance to electrical conduction between the propeller and the aircraft engine than the first electrically-conductive path.

2. The blade angle feedback assembly of claim 1, wherein the electric current conduction element comprises an annular slip ring disposed between the propeller and a reduction gearbox of the aircraft engine.

3. The blade angle feedback assembly of claim 2, wherein the slip ring is secured to a housing of the reduction gearbox and receives therein a propeller shaft, an electrical conductivity of the slip ring greater than an electrical conductivity of at least one bearing assembly of the propeller shaft.

4. The blade angle feedback assembly of claim 2, wherein the slip ring is provided on a rear face of the propeller, the slip ring electrically connected to the propeller through an electrically-conductive brush block assembly and to the reduction gearbox via a grounding cable.

5. The blade angle feedback assembly of claim 2, wherein the propeller is rotatable by a propeller shaft about an axis and further wherein the slip ring is provided on a rear face of the feedback ring and is configured to move along the axis with the feedback ring, the slip ring connected to an electrically-conductive brush block assembly, the brush block assembly attached to the reduction gearbox and spring loaded to force contact with the slip ring.

6. The blade angle feedback assembly of claim 1, wherein the feedback ring is coupled to rotate with the propeller.

7. The blade angle feedback assembly of claim 6, wherein the at least one sensor is mounted adjacent the feedback ring and configured to detect, as the feedback ring rotates, passage of the one or more position markers provided on an exposed surface of the feedback ring, the electric current conduction element comprising an engagement member protruding away from a reduction gearbox of the aircraft engine and towards the exposed surface, a clearance between the engagement member and the feedback ring greater than a clearance between the at least one sensor and the feedback ring.

8. A propeller system for an aircraft engine, the system comprising:
- a propeller rotatable by a propeller shaft about an axis, the propeller having propeller blades rotatable about respective spanwise axes to adjust a blade angle thereof, a first electrically-conductive path defined between the propeller and the aircraft engine via a feedback ring used to provide feedback on a blade angle of the propeller blades; and
- an electric current conduction element provided between the propeller and the aircraft engine to define a second and parallel electrically-conductive path between the aircraft propeller and the aircraft engine, the second electrically-conductive path configured with a lower electrical resistance to electrical conduction between the propeller and the aircraft engine than the first electrically-conductive path.

9. The propeller system of claim 8, wherein the electric current conduction element comprises an annular slip ring secured to a housing of a reduction gearbox of the aircraft engine and configured to receive therein the propeller shaft, an electrical conductivity of the slip ring greater than an electrical conductivity of at least one bearing assembly of the propeller shaft.

10. The propeller system of claim 8, wherein the electric current conduction element comprises an annular slip ring provided on a rear face of the propeller, the slip ring electrically connected to the propeller through an electrically-conductive brush block assembly and to a reduction gearbox of the aircraft engine via a grounding cable.

11. The propeller system of claim 8, wherein the feedback ring is coupled to rotate with the propeller and to move along the axis with adjustment of the blade angle.

12. The propeller system of claim 11, wherein the electric current conduction element comprises an annular slip ring provided on a rear face of the feedback ring and is configured to move along the axis with the feedback ring, the slip ring connected to an electrically-conductive brush block assembly, the brush block assembly attached to a reduction gearbox of the aircraft engine and spring loaded to force contact with the slip ring.

13. The propeller system of claim 8, further comprising at least one sensor configured to provide feedback on the blade angle of the propeller blades by detecting a relative movement between the feedback ring and the at least one sensor.

14. The propeller system of claim 13, wherein the at least one sensor is mounted adjacent the feedback ring and configured to detect, as the feedback ring rotates, passage of the one or more position markers provided on an exposed surface of the feedback ring, the electric current conduction element comprising an engagement member protruding away from a reduction gearbox of the aircraft engine and towards the exposed surface, a clearance between the engagement member and the feedback ring greater than a clearance between the at least one sensor and the feedback ring.

15. A method for dissipating electrical charge in an aircraft engine, the method comprising:
- establishing, via an electric current conduction element provided between a propeller of the aircraft engine and the aircraft engine, an electrically-conductive path between the propeller and the aircraft engine, the electrically-conductive path having a lower electrical resistance than the electrical resistance of a path defined between the propeller and a feedback ring used to provide feedback on a blade angle of propeller blades of the propeller.

16. The method of claim 15, wherein the electrically-conductive path is established via the electric current conduction element comprising an annular slip ring secured to a housing of a reduction gearbox of the aircraft engine, the slip ring receiving therein the shaft, an electrical conductivity of the slip ring greater than an electrical conductivity of at least one bearing assembly of the shaft.

17. The method of claim 15, wherein the electrically-conductive path is established via the electric current conduction element comprising an annular slip ring electrically connected to a rear face of the propeller through an electrically-conductive brush block assembly and to a reduction gearbox of the aircraft engine via a grounding cable.

18. The method of claim 15, wherein the electrically-conductive path is established via the electric current conduction element comprising an annular slip ring provided on a rear face of the feedback ring and moveable with the feedback ring along an axis, the slip ring connected to an electrically-conductive brush block assembly, the brush block assembly attached to a reduction gearbox of the aircraft engine and spring loaded to force contact with the slip ring.

19. The method of claim 15, wherein the electrically-conductive path is established via the electric current conduction element comprising an engagement member protruding away from a reduction gearbox of the aircraft engine and towards an exposed surface of the feedback ring, a clearance between the engagement member and the feedback ring greater than a clearance between the feedback ring and a sensor mounted adjacent the feedback ring, the sensor configured to detect, as the feedback ring rotates, passage of one or more position markers provided on the exposed surface.

20. The method of claim 15, wherein the feedback ring is coupled to the propeller.

* * * * *